US008032357B2

(12) United States Patent
Kung et al.

(10) Patent No.: US 8,032,357 B2
(45) Date of Patent: Oct. 4, 2011

(54) PHONETIC INPUT USING A KEYPAD

(75) Inventors: Jordan Y. C. Kung, Keelung (TW); Gary Wang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 11/292,826

(22) Filed: Dec. 2, 2005

(65) Prior Publication Data

US 2006/0282583 A1 Dec. 14, 2006

Related U.S. Application Data

(60) Provisional application No. 60/690,657, filed on Jun. 14, 2005.

(51) Int. Cl.
*G06F 17/28* (2006.01)
*G06G 5/00* (2006.01)
*H03K 17/94* (2006.01)
*H03M 11/00* (2006.01)
*B41J 5/00* (2006.01)

(52) U.S. Cl. ............... 704/5; 345/171; 341/28; 400/110
(58) Field of Classification Search .................. 704/1–10
See application file for complete search history.

(56) References Cited

U.S. PATENT DOCUMENTS

| | | | | |
|---|---|---|---|---|
| 6,005,498 A * | 12/1999 | Yang et al. | ............ | 341/23 |
| 6,161,116 A * | 12/2000 | Saltzman | ............ | 715/262 |
| 6,307,541 B1 * | 10/2001 | Ho et al. | ............ | 345/171 |
| 6,356,258 B1 * | 3/2002 | Kato et al. | ............ | 345/168 |
| 6,809,725 B1 | 10/2004 | Zhang | ............ | 345/171 |
| 6,822,585 B1 * | 11/2004 | Ni et al. | ............ | 341/28 |
| 7,061,403 B2 * | 6/2006 | Fux | ............ | 341/28 |
| 7,256,769 B2 * | 8/2007 | Pun et al. | ............ | 345/171 |
| 7,257,528 B1 * | 8/2007 | Ritchie et al. | ............ | 704/7 |
| 7,395,203 B2 * | 7/2008 | Wu et al. | ............ | 704/235 |
| 7,671,765 B2 * | 3/2010 | Fux | ............ | 341/28 |

(Continued)

FOREIGN PATENT DOCUMENTS

JP HEI 10-105312 4/1998

(Continued)

OTHER PUBLICATIONS

European Search Report issued Oct. 12, 2009 in Application No. 06759245.1, 7 pgs.

(Continued)

*Primary Examiner* — Talivaldis Ivars Smits
*Assistant Examiner* — Matthew Baker
(74) *Attorney, Agent, or Firm* — Merchant & Gould

(57) ABSTRACT

A keypad is used to enter complex characters using a phonetic input method editor (IME). The user may enter complex characters by combining consonants, vowels, mid-vowels and tones by selecting keys on a the keypad instead of using a full size keyboard. Instead of a one-to-one mapping between the symbols and keys on a full size keyboard, multiple symbols are assigned to single keys on the keypad. For example, on a keypad having ten keys an average of four phonetic symbols are mapped to each of the ten keys on the keypad. The phonetic symbols are applied to the keypad in layers. For example, the symbols may be may be mapped to a consonant layer; a middle vowels+vowels layer; a vowels layer and a tone layer. Phonetic symbols with similar readings may also be mapped to the same key.

20 Claims, 16 Drawing Sheets

U.S. PATENT DOCUMENTS

| | | | |
|---|---|---|---|
| 2003/0184451 A1 | 10/2003 | Li | 341/22 |
| 2004/0021641 A1 | 2/2004 | Ho | 345/171 |
| 2004/0243389 A1* | 12/2004 | Thomas et al. | 704/1 |
| 2006/0227016 A1* | 10/2006 | Fux | 341/22 |
| 2006/0282583 A1* | 12/2006 | Kung et al. | 710/67 |

FOREIGN PATENT DOCUMENTS

| | | |
|---|---|---|
| JP | 2002-305924 | 11/2000 |
| JP | 2002-312111 | 10/2002 |
| JP | 2003-067375 | 3/2003 |
| JP | 2004-523030 | 7/2004 |

OTHER PUBLICATIONS

Office Action mailed Dec. 2, 2009, in EP Application No. 06759245.1.

Office Action mailed Jun. 26, 2009, in CN Application No. 200680017327.3, w/Translation.

Office Action mailed Jan. 8, 2010, in CN Application No. 200680017327.3, w/Translation.

Office Action mailed Jun. 24, 2011, in JP Application No. 2008-516876, w/Translation.

* cited by examiner

| Consonant | Vowel | Tone mark |
|---|---|---|
| ㄅ | ㄧ | First tone ( ) |
| ㄆ | ㄨ | Second tone ( ´ ) |
| ㄇ | ㄩ | Third tone ( ˇ ) |
| ㄈ | ㄚ | Fourth tone ( ` ) |
| ㄉ | ㄛ | Neutral tone ( · ) |
| ㄊ | ㄜ | |
| ㄋ | ㄝ | |
| ㄌ | ㄞ | |
| ㄍ | ㄟ | |
| ㄎ | ㄠ | |
| ㄏ | ㄡ | |
| ㄐ | ㄢ | |
| ㄑ | ㄣ | |
| ㄒ | ㄤ | |
| ㄓ | ㄥ | |
| ㄔ | ㄦ | |
| ㄕ | | |
| ㄖ | | |
| ㄗ | | |
| ㄘ | | |
| ㄙ | | |

*Fig. 2*

*Phonetic with Fuzzy Pairs* ⟵ 400

|   | Consonants | Vowels |
|---|---|---|
| 1. | ㄅㄆ | ㄛㄜ |
| 2. | ㄈㄏ | ㄝㄟ |
| 3. | ㄉㄊ | ㄞㄤ |
| 4. | ㄋㄌ | ㄣㄥ |
| 5. | ㄍㄎ | |
| 6. | ㄓㄗ | |
| 7. | ㄔㄘ | |
| 8. | ㄕㄙ | |

*Phonetic without Fuzzy Pairs* ⟵ 410

|   | Consonants | Vowels |
|---|---|---|
| 1. | ㄇ | ㄧ |
| 2. | ㄐ | ㄨ |
| 3. | ㄑ | ㄩ |
| 4. | ㄒ | ㄚ |
| 5. | ㄖ | ㄞ |
| 6. | | ㄠ |
| 7. | | ㄡ |
| 8. | | ㄦ |

*Fig. 4*

*First Layer*

| ㄅㄆ | ㄇ | ㄈㄏ |
|---|---|---|
| 1 | 2 | 3 |
| ㄉㄊ | ㄋㄌㄖ | ㄍㄎ |
| 4 | 5 | 6 |
| ㄐㄓㄗ | ㄑㄔㄘ | ㄒㄕㄙ |
| 7 | 8 | 9 |
|  | (Go to Vowel Layer) |  |
| * | 0 | # |

*Fig. 5*

Second Layer

| ㄚㄞ | ㄛㄜㄦ | ㄝㄟ |
|---|---|---|
| 1 | 2 | 3 |
| ㄠㄡ | ㄢㄤ | ㄣㄥ |
| 4 | 5 | 6 |
| ㄧ | ㄨ | ㄩ |
| 7 | 8 | 9 |
|  | (Go to Tone Layer) |  |
| * | 0 | # |

*Fig. 6*

*Third Layer*

| | | |
|---|---|---|
| ㄚㄞ | ㄛㄜㄦ | ㄝㄟ |
| 1 | 2 | 3 |
| ㄠㄡ | ㄢㄤ | ㄣㄥ |
| 4 | 5 | 6 |
| | | |
| 7 | 8 | 9 |
| | (Go to Tone Layer) | |
| * | 0 | # |

*Fig. 7*

*Fourth Layer*

| First Tone | Second Tone | Third Tone |
|---|---|---|
| 1 | 2 | 3 |
| Fourth Tone | Fifth Tone | |
| 4 | 5 | 6 |
| | | |
| 7 | 8 | 9 |
| | (Go to Tone Layer) | |
| * | 0 | # |

*Fig. 8*

PHONETIC INPUT USING A KEYPAD

RELATED APPLICATIONS

This utility patent application claims the benefit under 35 United States Code §19(e) of U.S. Provisional Patent Application No. 60/690,657 filed on Jun. 14, 2005, which is hereby incorporated by reference in its entirety.

BACKGROUND

At first glance, entering East Asian characters from a full size keyboard seems like an impossible task. There are literally thousands of Chinese characters which a user might choose to enter. Entering the characters, however, is made easier through the use of Input Method Editors (IMEs). An IME is a program that allows computer users to enter complex characters and symbols, such as Japanese characters, Chinese characters, and Korean characters using a full size keyboard. Using the IMEs, users can input Chinese, Japanese, and Korean text directly into desktop applications, Web forms, and e-mail messages using their full size keyboard.

IMEs are designed to help individuals and businesses who want to communicate in Chinese, Japanese, or Korean without making them run a separate Chinese, Japanese, or Korean version of their operating system. For example, a business based in New York could use its U.S. version of the browser to send messages in Korean to an overseas affiliate. Similarly, a student attending classes in Paris could write documents in Japanese on their French based operating system using an IME and their full size keyboard.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A phonetic input method editor (IME) is used to enter Chinese characters using a keypad. Complex characters and symbols may be entered using the keypad. A user generates the Chinese characters by combining consonants, vowels, mid-vowels and tones by selecting keys on a the keypad instead of using a full size keyboard. Instead of a one-to-one mapping between the symbols and keys on a full size keyboard, multiple symbols are assigned to single keys on the keypad. For example, on a keypad having ten keys an average of four phonetic symbols are mapped to each of the ten keys on the keypad. The phonetic symbols are applied to the keypad in layers. For example, the symbols may be may be mapped to a consonant layer; a middle vowels+vowels layer; a vowels layer and a tone layer. Phonetic symbols with similar readings may also be mapped to the same key.

BRIEF DESCRIPTION OF THE DRAWINGS

FIG. 2 shows a list of Chinese phonetic symbols;

FIG. 4 shows grouping some of the phonetics using fuzzy pairs;

FIGS. 5-8 illustrate exemplary key assignments in four layers;

DETAILED DESCRIPTION OF THE PREFERRED EMBODIMENT

Figure 1:
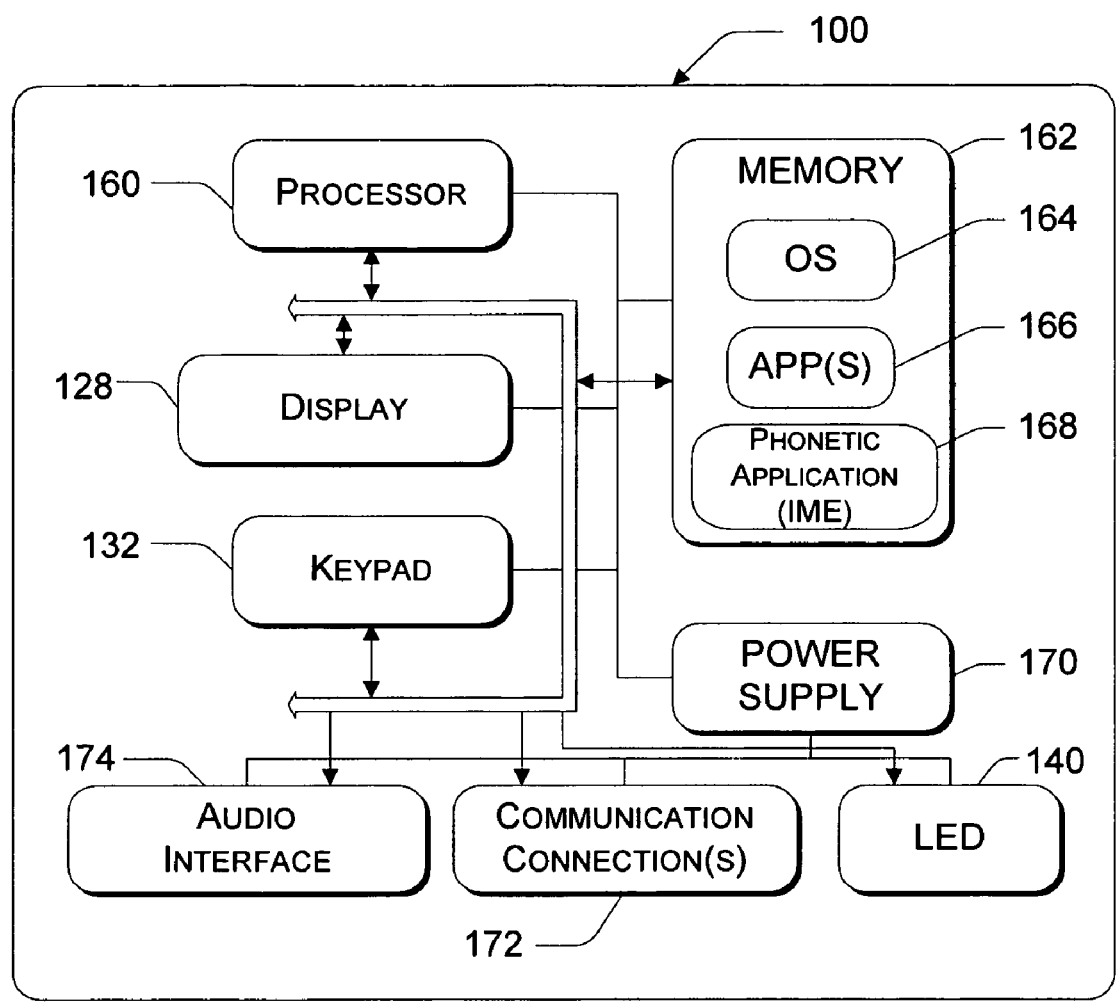
FIG. 1 illustrates an exemplary computing device that may be used in exemplary embodiments of the present invention.

Generally, a keypad in conjunction with a phonetic input method editor (IME) is used to enter Chinese characters. Using the keypad, the user may enter complex characters. Chinese characters are generated by combining consonants, vowels, mid-vowels and tones by selecting keys on a the keypad instead of using a full size keyboard. Instead of a one-to-one mapping between the symbols and keys on a full size keyboard, multiple symbols may be assigned to single keys on the keypad. For example, on a keypad having ten keys an average of four phonetic symbols are mapped to each of the ten keys on the keypad. The phonetic symbols are applied to the keypad in layers. For example, the phonetic symbols may be mapped to a consonant layer; a middle vowels+vowels layer; a vowels layer and a tone layer. Phonetic symbols with similar readings may also be mapped to the same key.

FIG. 2 shows a list of Chinese phonetic symbols, in accordance with aspects of the invention. Chinese phonetic symbols may be represented by 42 different symbols including 21 consonants (215), 16 vowels (220) and 5 tone marks (225).

Unlike on a standard desktop PC that includes a full size keyboard where these 42 phonetic symbols (200) may be easily mapped to a full size keyboard using a one-to-one keyboard mapping, keypads having fewer than 42 keys do not allow this one-to-one mapping. For example, some devices, such as telephones, mobile phones and remote controllers, have 10 to 12 keys, or even fewer keys. On devices not allowing a one-to-one mapping, multiple symbols are assigned to a single key on the device's keypad. For example, a keypad having 10 keys has on average four (4) phonetic symbols assigned to each key. Similarly, a keypad having 8 keys would have on average five (5) phonetic symbols assigned to each key. The mapping may be applied to a full size keyboard when all of the keys on the keyboard are not used in the mapping. For example, only a subset of the keys (less than 42) are available for mapping.

Using a full size keyboard on average requires the user to press 2 to 4 keys for inputting phonetic symbols to obtain a list of Chinese characters. Using a keypad, on the other hand, typically requires the user to select up to 5 keys to obtain the same character list as when using a full size keyboard.

Figure 3:
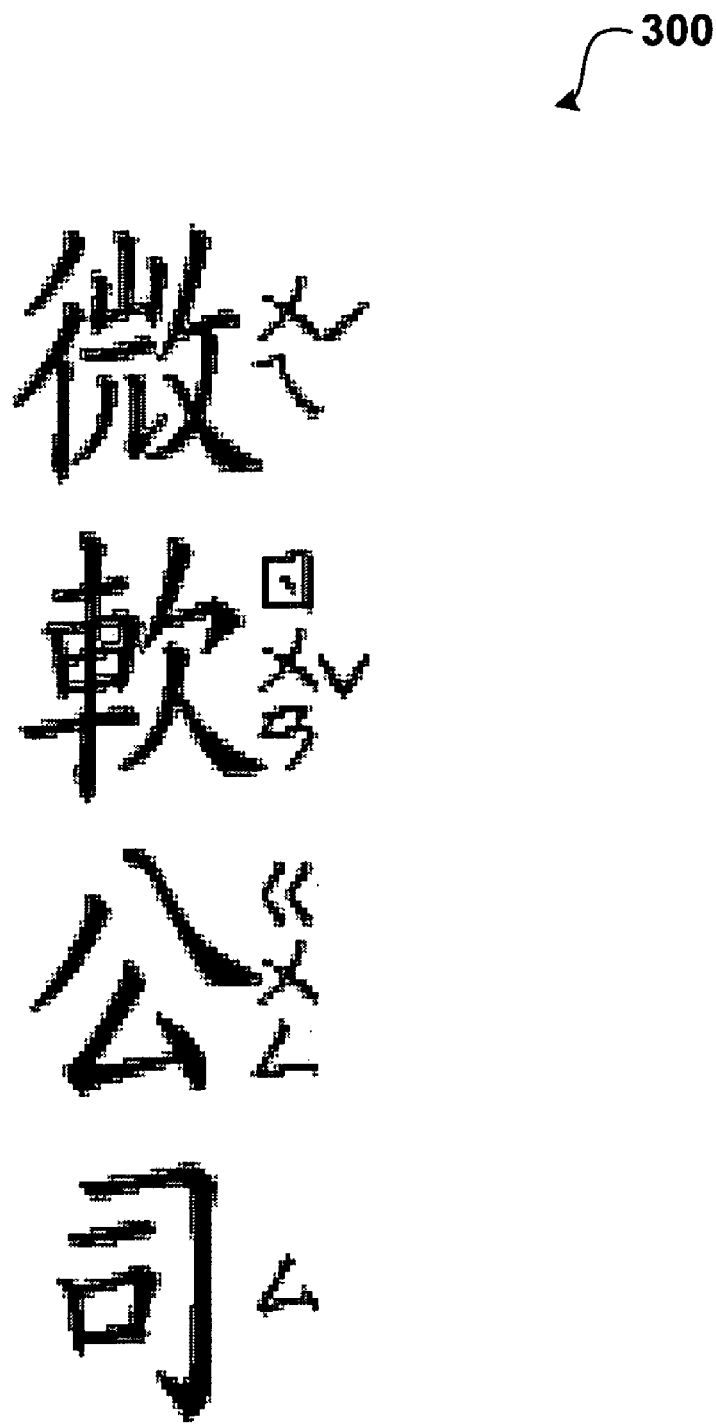
FIG. 3 illustrates exemplary readings of a character.

FIG. 3 illustrates exemplary readings of characters (300), in accordance with aspects of the invention. The reading of a character usually can be formatted into various combinations of consonants, middle vowels, vowels and tone marks as shown in FIG. 3. Using a keypad, a user may enter these complex characters.

FIG. 4 shows grouping some of the phonetic symbols using fuzzy pairs, in accordance with aspects of the present invention. Not every phonetic symbol has a corresponding similar phonetic symbol. As used herein, a fuzzy pair is a pair of symbols having a similar reading.

Table 400 illustrates phonetics with fuzzy pairs. Each cell populated within the table includes at least two phonetic symbols. As can be seen, there are eight consonant fuzzy pairs and there are four vowel fuzzy pairs.

Table 410 shows phonetics without fuzzy pairs. Each cell populated in this table includes a single phonetic. As can be seen, there are five single consonants and eight single vowels.

According to one embodiment, the phonetics that have a corresponding similar phonetic symbol (400) are mapped to the same key on the keypad. For example, the consonants in row 1 of table 400 are mapped to one key, while the consonants in row 2 of table 400 are mapped to another key. Similarly, the vowels in each row of table 400 may be mapped to a different key.

FIGS. 5-8 illustrate exemplary key assignments using four layers, in accordance with aspects of the invention.

As there are fewer than 42 keys available on the keypad, the keyboard is configured to have multiple layers such that all of the phonetic symbols may be applied to a key on the keypad. According to one embodiment, phonetic symbols are assigned in four layers, including a: (1) consonant layer; (2) a middle vowels+vowels layer; (3) a vowels layer and (4) tone marks layer. Other layers may be configured. For example, a keypad could include fewer or more layers.

As discussed above, according to one embodiment, the associated fuzzy (similar) readings are assigned to the same keys.

In order to further clarify, exemplary keypad layers will be described. Each figure illustrated below shows the key assignments to a standard 12 key keypad. Other sized keypads may be utilized and may be utilized on many different types of devices. For example, the keypad may be on a remote control device, on a phone, and the like.

FIG. 5 shows key assignments for a first layer (500), in accordance with aspects of the invention. According to one embodiment, the first layer on keypad 500 is a consonant layer. In this embodiment, each key on the first layer may include zero or more consonants. As can be seen referring to keypad 500, key "1" maps two consonants that have been determined to be fuzzy readings to the same key. Keys 3-9 also map several consonants to the same key. Key "2" shows a phonetic without a fuzzy pair. As illustrated, the "*" key and the "#" key do not have any consonants mapped to them. One or more keys on the keypad may be used to navigate among the various layers of the keypad. For example, as illustrated on keypad 500, key "0" on is used to move to a vowel layer.

FIG. 6 shows key assignments for a second layer (600), in accordance with aspects of the invention. According to one embodiment, the second layer maps to a middle vowels+vowels layer. As illustrated, keys 2, 3, 5 and 6 each include a fuzzy pair. Key "0" is used to navigate to the tone layer.

FIG. 7 shows key assignments for a third layer (700), in accordance with aspects of the invention. According to one embodiment, the third layer is a vowel layer. Keys 2, 3, 5, and 6 include a fuzzy pair. As can be seen, not all of the keys on the keypad are mapped to a phonetic on each layer. Each layer may be designed to include as many mappings or as few a mappings as desired. Key "0" is used to navigate to the tone layer.

FIG. 8 shows key assignments for a fourth layer (800), in accordance with aspects of the invention. According to one embodiment, the fourth layer is a tone layer. As illustrated, fourth layer 800 includes key 0 that is mapped to a first tone, key 2 that is mapped to a second tone; key 3 that is mapped to a third tone; key 4 that is mapped to a fourth tone; and key 5 that is mapped to a fifth tone. As many tones as desired may be included.

Illustrative Process

Figure 9:
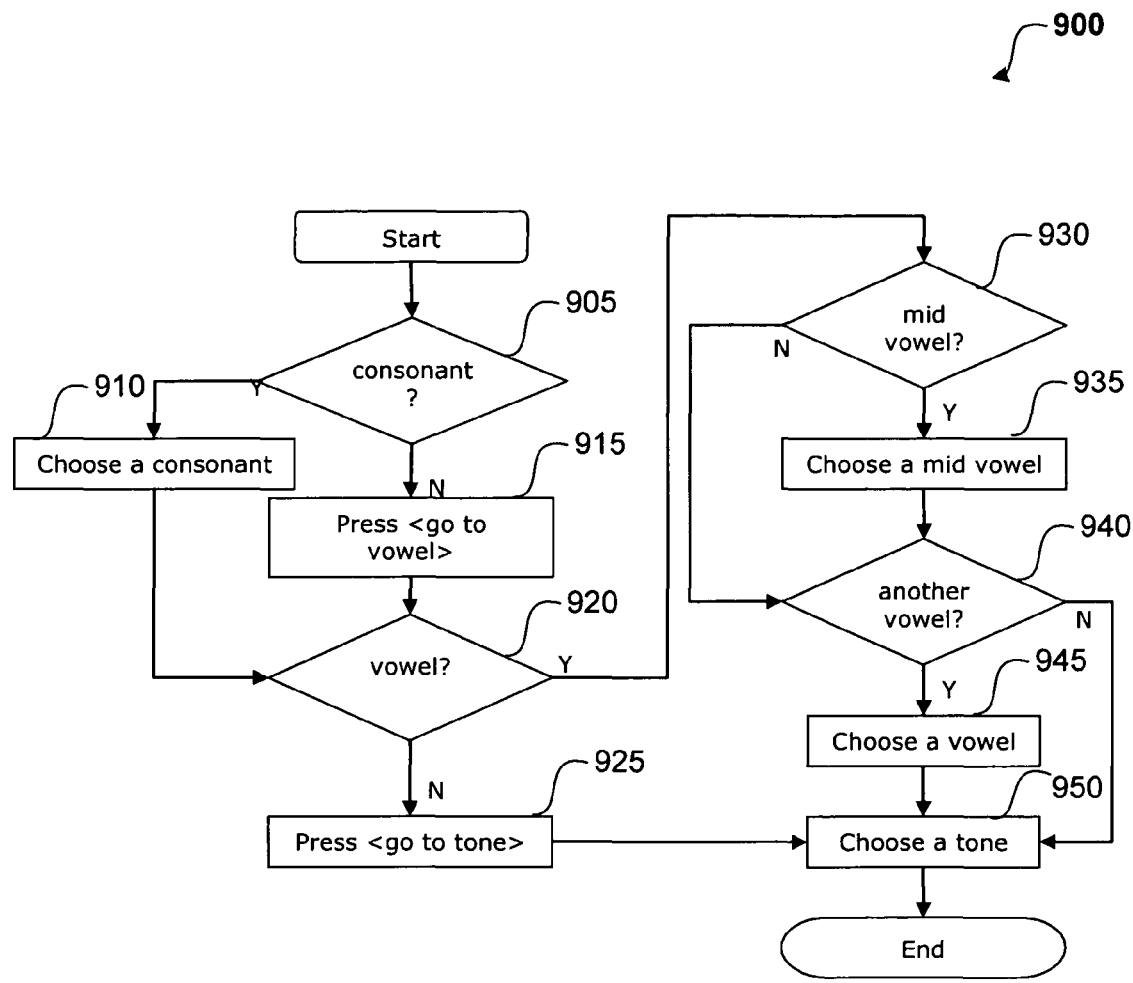
FIG. 9 illustrates a process flow for entering a Chinese character using a keypad.

FIG. 9 illustrates a process flow 900 for entering a Chinese character using a keypad, in accordance with aspects of the invention.

After a start block, the process flows to block 905 where a determination is made as to whether the symbol entered using the keypad is a consonant. When the symbol is not a consonant, the process flows to block 915, where <go to vowel> is selected.

When the symbol is a consonant, the process moves to block 910 where a consonant is chosen. The process then flows to decision block 920.

At decision block 920, a determination is made as to whether the symbol is a vowel. When the symbol is not a vowel, the process flows to block 925 where <go to tone> is selected.

When the symbol is a vowel, the process moves to decision block 930 where a determination is made as to whether the symbol is a mid vowel. When the symbol is a mid vowel, the process flows to block 935 where a mid vowel is chosen. When the symbol is not a mid vowel, the process flows to decision block 940 where a determination is made as to whether there is another vowel. When there is another vowel, the process flows to block 945 where a vowel is chosen. When there is not another vowel, the process flows to block 950 where a tone is chosen. The process then moves to an end block and returns to processing other actions.

Example

FIGS. 10-16 show exemplary screenshots for inputting a Chinese character using a keypad, in accordance with aspects of the invention. As illustrated in the example, the user eventually enters 14571 on the keypad to generate a Chinese character.

Figure 10:
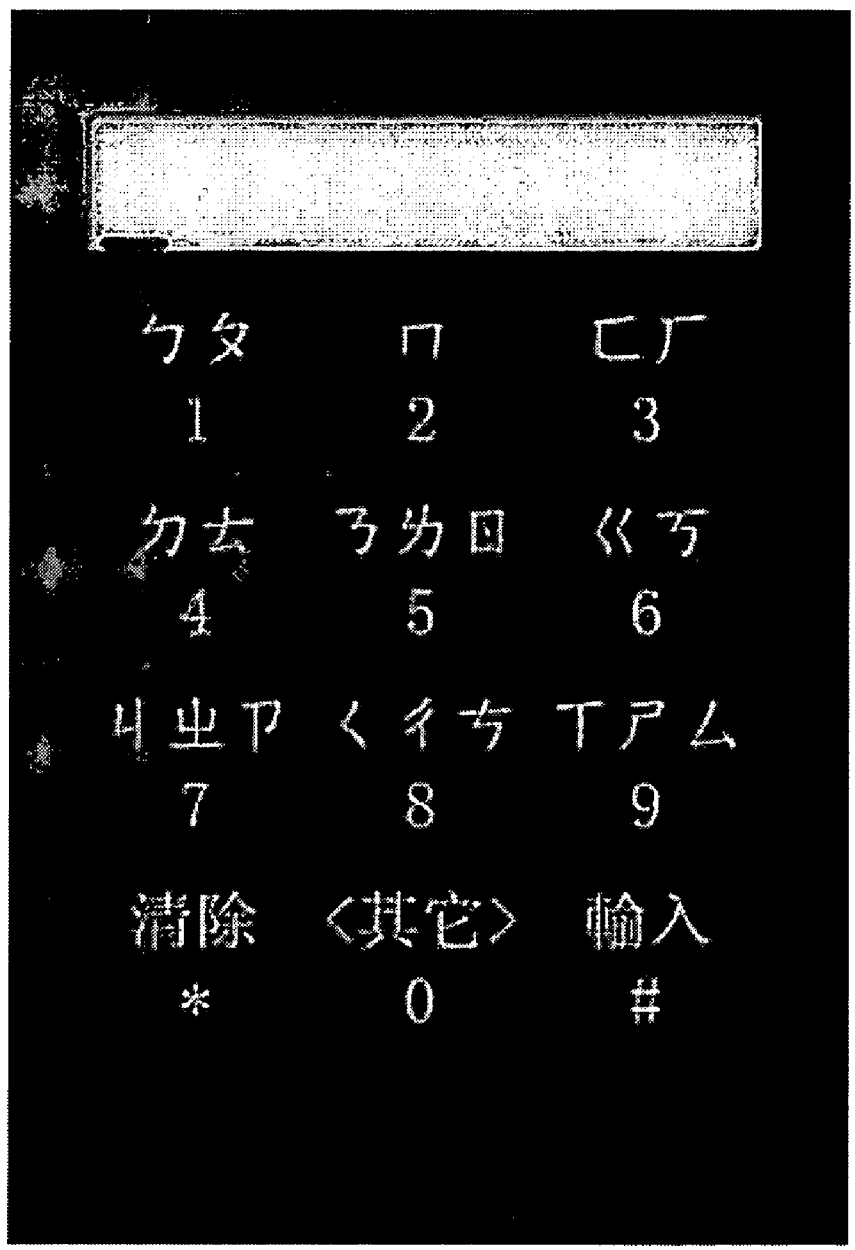
FIGS. 10-16 show exemplary screenshots for inputting a Chinese character using a keypad, in accordance with aspects of the invention.

FIG. 10 shows the default keypad layout (1000) without any input. According to one embodiment, the key assignments initially displayed are the first layer key assignments as illustrated in FIG. 5, with the additions of the characters above the * key, the 0 key, and the # key.

Figure 11:

Moving to FIG. 11, the user enters a "1" and the characters assigned to the keypad (1100) change to the second layer assignments (See FIG. 6).

Figure 12:
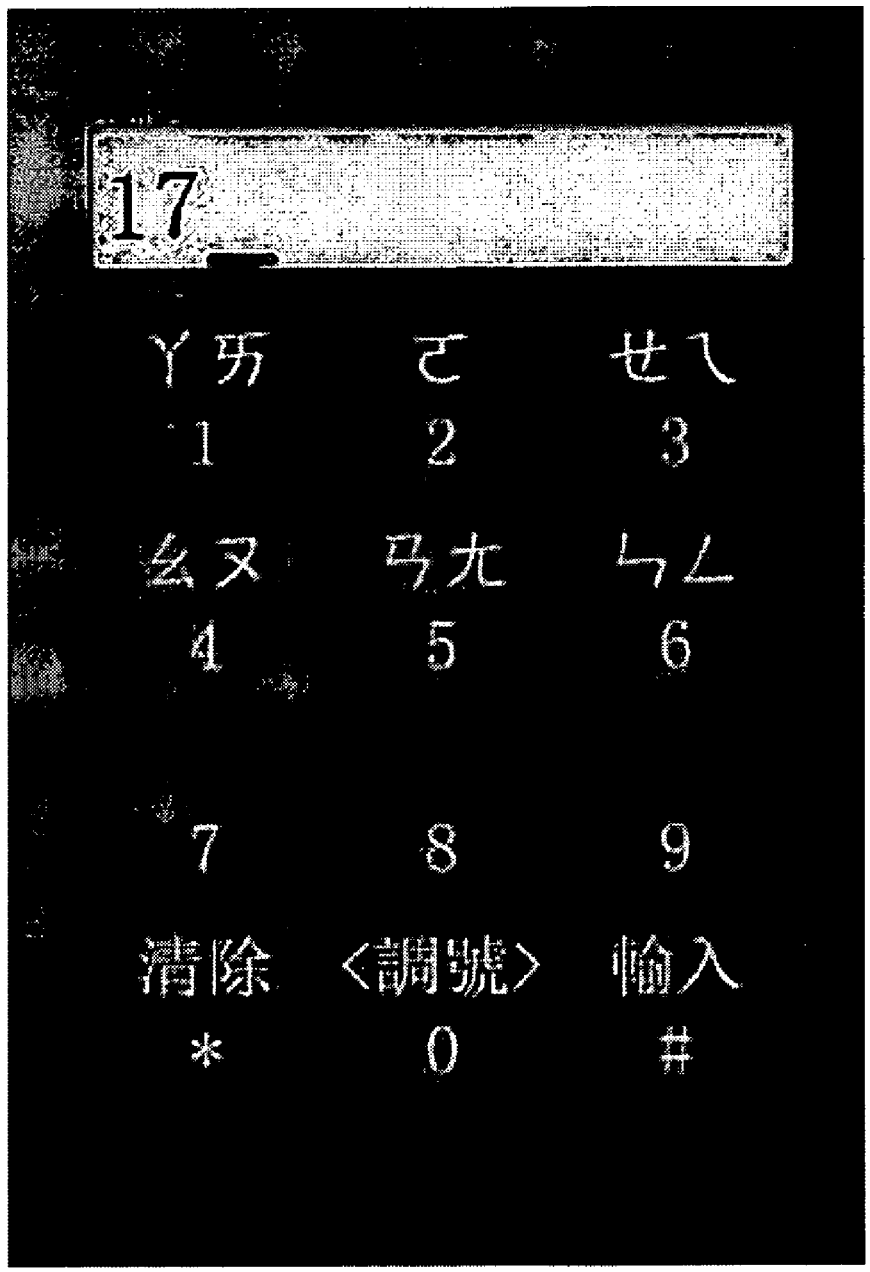

Moving to FIG. 12, the user enters a "7" into the keypad (1200). Based on the combination of the "1" and the "7" the characters shown above keys 7-9 in FIG. 11 are not shown in FIG. 12.

Figure 13:
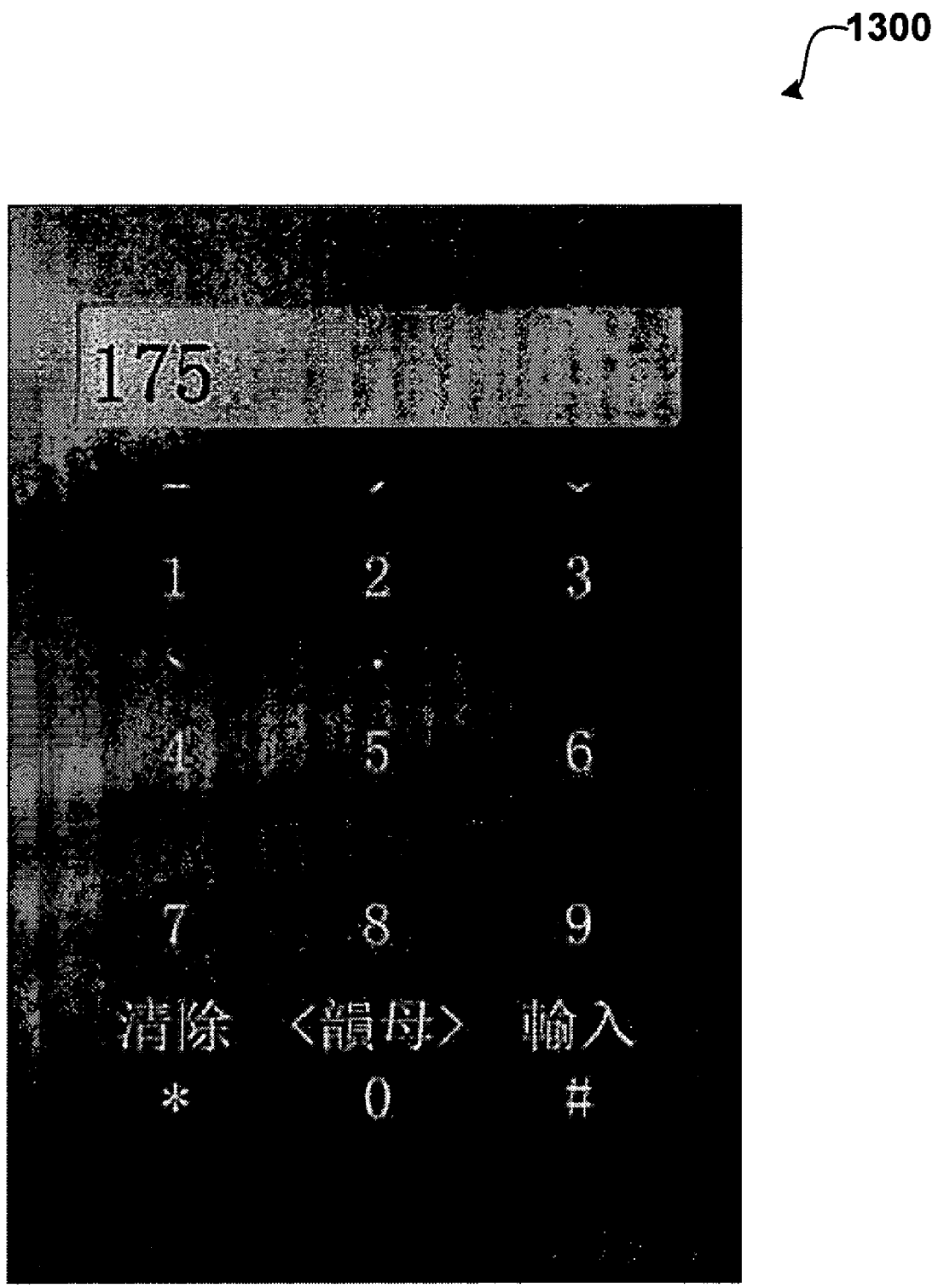

At FIG. 13, the user has entered a "5" into the keypad (1300) in addition to the already entered "1" and "7" Entering the "5" displays the tones.

Figure 14:
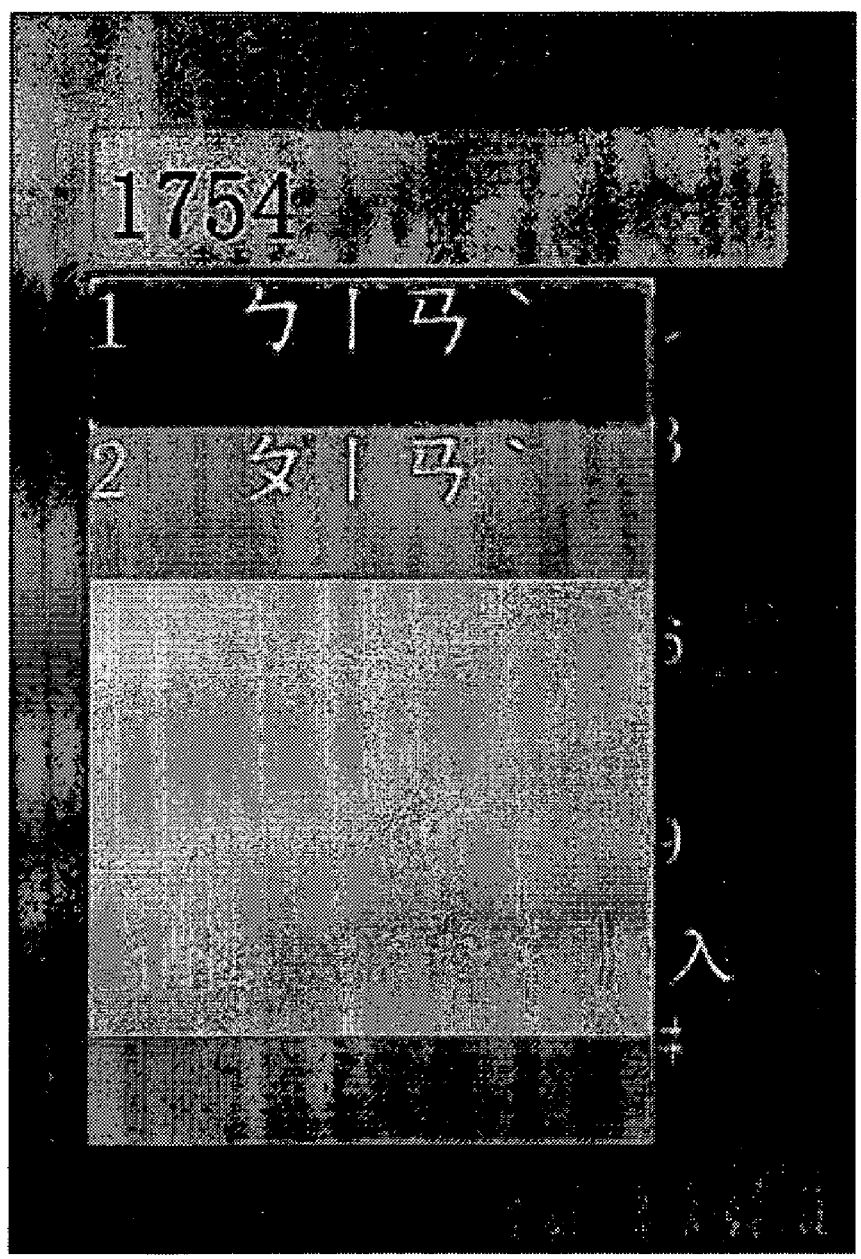

FIG. 14 illustrates the user selecting tone 4 on the keypad (1400). After the user selects tone 4, a list of possible alternatives are displayed to the user. In the present example, a list of two alternatives are displayed to the user.

Figure 15:
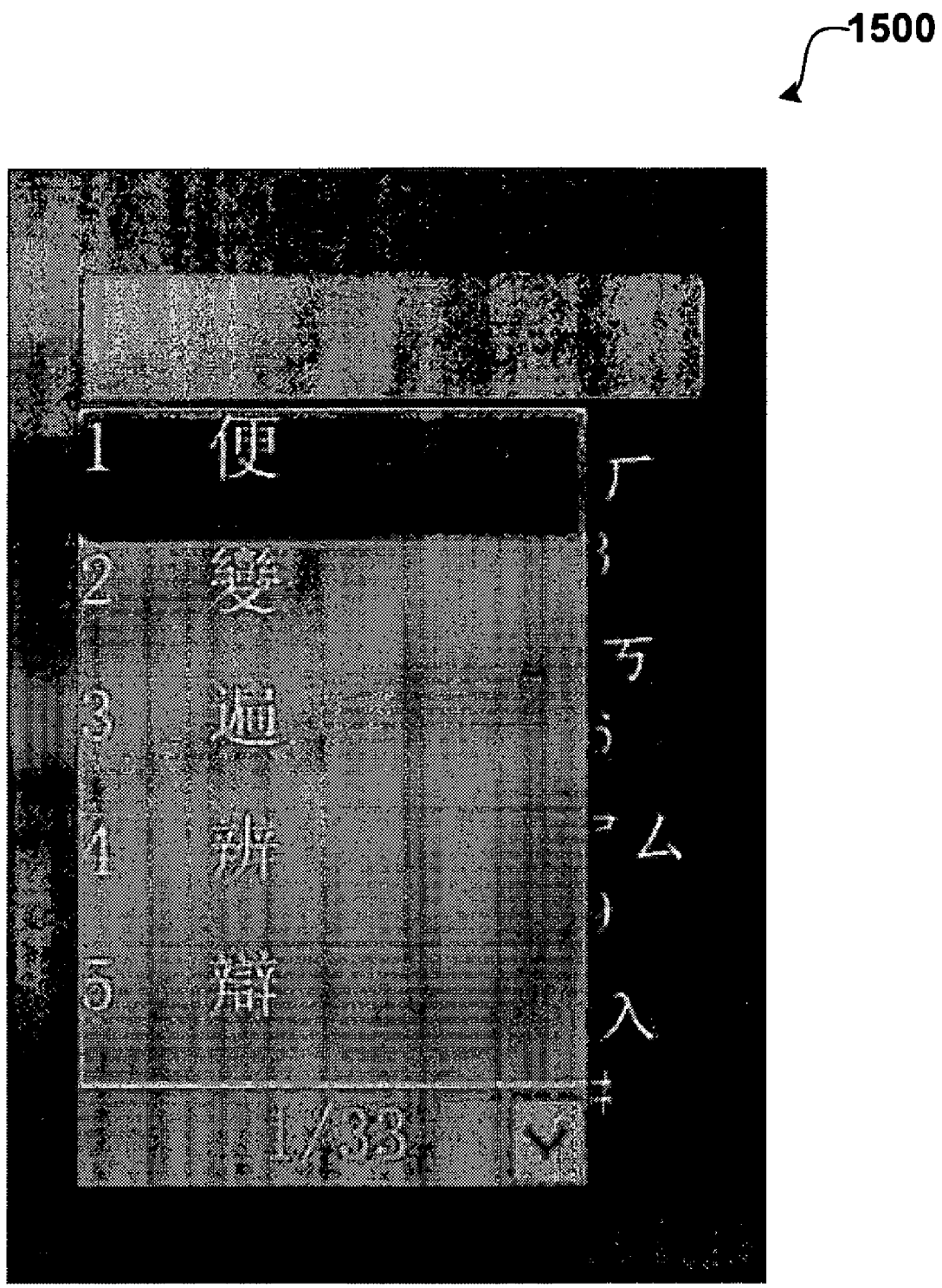
Figure 16:
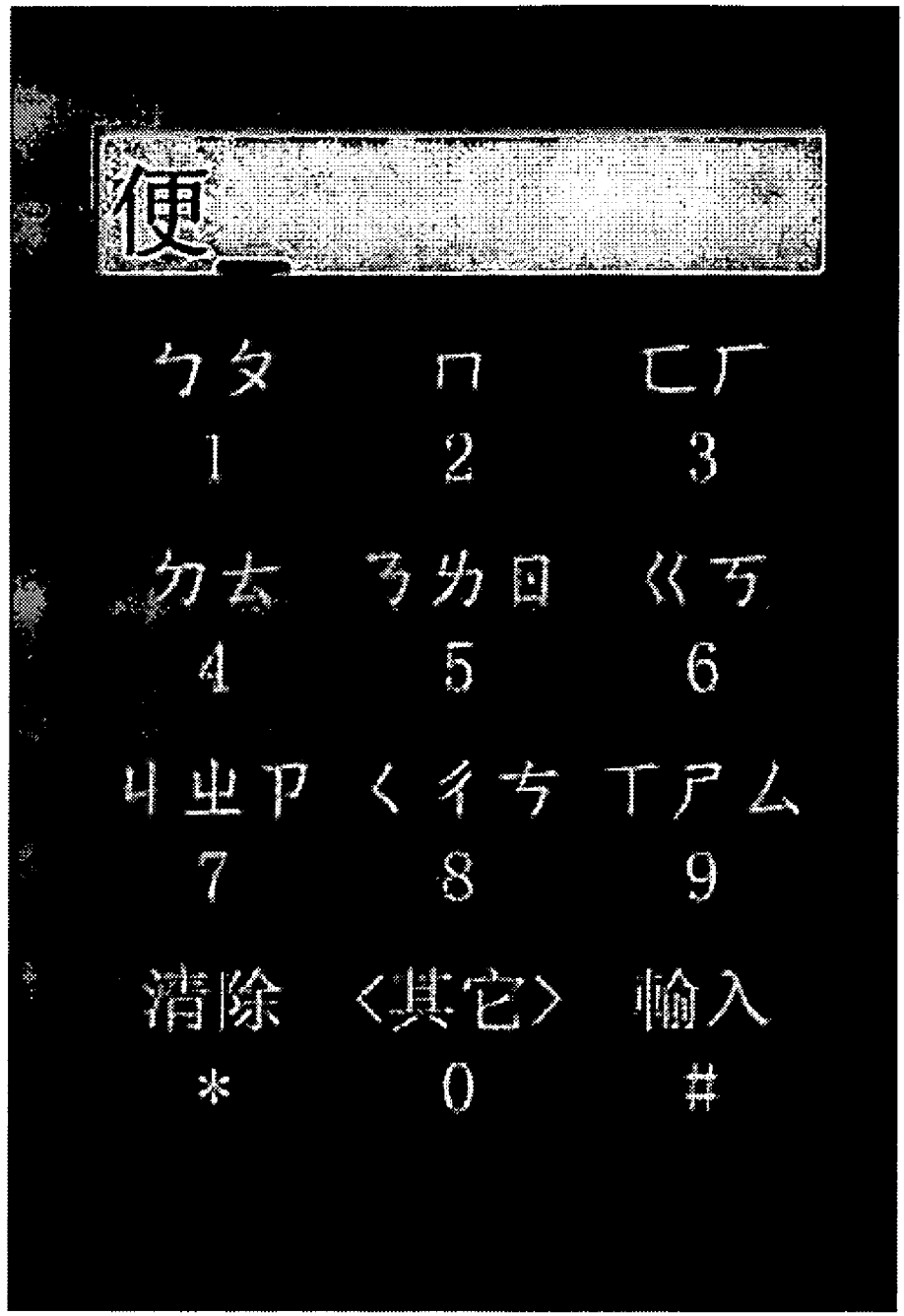

FIG. 15 shows the potential readings of the character based on the user selecting the first alternative within the previous menu (1500). A list of alternatives is displayed to the user within a candidate window. After the user highlights the desired alternative, the selected character is displayed as is shown in FIG. 16. The selected character is sent to the active window.

FIG. 16 illustrates the input Chinese character based on the user selecting the first reading of the character (1600).

Illustrative Operating Environment

FIG. 1 illustrates a computing device that may be used in one exemplary embodiment of the present invention. According to one embodiment, the device is a mobile computing device. The device may be any device that includes a keypad and/or another input device that includes a limited set of keys that are mapped that is fewer in number as compared to the number of phonetic characters. As illustrated, device 100 includes processor 160, memory 162, display 128, and keypad 132. Memory 162 generally includes both volatile memory (e.g., RAM) and non-volatile memory (e.g., ROM, Flash Memory, or the like). Computing device 100 includes operating system 164, such as the Windows Mobile 2003 operating system or Windows CE from Microsoft Corporation, or another operating system, which is resident in memory 162 and executes on processor 160. Computing device 100 may be configured in many different ways. For example, computing device 100 could be a mobile phone, a PDA, a mobile computer, and the like. Keypad 132 may be a push button numeric dialing pad (such as on a typical telephone), a multi-key keyboard. Display 128 may be a liquid crystal display, or any other type of display commonly used in mobile computing devices. Display 128 may be touch-sensitive, and would then also act as an input device.

One or more application programs 166 are loaded into memory 162 and run on the operating system 164. Phonetic application 168 is configured to enter Chinese characters using a keypad. The application may reside in the hardware or software of the device. Computing device 100 also includes non-volatile storage 168 within memory 162. Non-volatile storage may be used to store persistent information which should not be lost if mobile computing device 100 is powered down.

Computing device 100 includes power supply 170, which may be implemented as one or more batteries. Power supply 170 might further include an external power source, such as an AC adapter or a powered docking cradle that supplements or recharges the batteries.

Computing device 100 is shown with two types of optional external notification mechanisms: LED 140 and audio interface 174. These devices may be directly coupled to power supply 170 so that when activated, they remain on for a duration dictated by the notification mechanism even though processor 160 and other components might shut down to conserve battery power. Audio interface 174 is used to provide audible signals to and receive audible signals from the user. For example, audio interface 174 may be coupled to a speaker for providing audible output and to a microphone for receiving audible input, such as to facilitate a telephone conversation.

Computing device 100 may also include communications connection(s), such as a wireless interface layer, that performs the function of transmitting and receiving communications. Communications connection 172 facilitates wireless connectivity between the computing device 100 and the outside world. The communication connection may be configured to connect to any type of wireless network. According to one embodiment, transmissions to and from communications connection 172 are conducted under control of the operating system 164.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for inputting Chinese characters, comprising:
   a keypad having a number of keys; wherein a number of phonetic symbols are mapped to at least some of the keys on the keypad and wherein the number of phonetic symbols that are mapped is greater than the number of keys; wherein the phonetic symbols are divided into vowels and consonants and wherein the phonetic symbols within each group are grouped according to similar readings; wherein the phonetics with similar readings within each group are mapped to the same key; wherein only a consonant portion of the phonetic symbols are associated with the at least some of the keys during a first input, wherein the consonant portion of the phonetic symbols comprises more than twelve consonants and wherein at least one of the keys includes a single consonant, a portion of the keys include two consonants and another portion of the keys include three consonants, wherein only the consonant portion of the phonetic symbols are displayed during the first input and are selectable without changing the display of the consonants, and wherein a vowel portion of the phonetic symbols are associated with the at least some of the keys during a second input; wherein the phonetic symbols displayed during the first input for a key are different from the phonetic symbols displayed during the second input for the key; wherein the vowel portion of the phonetic symbols that are associated with the at least some of the keys during the second input is constant regardless of the first input; and
   an Input Method Editor (IME) that is configured to receive input from the keypad and in response to the input generate a Chinese character.

2. The apparatus of claim 1, wherein the keypad further comprises a number of layers; wherein a only the consonant portion of the number of the phonetic symbols are mapped to a first layer and only the vowel portion are mapped to a second layer.

3. The apparatus of claim 2, wherein the number of layers comprise: a consonant layer; a vowels layer; a middle vowels plus vowels layer; and a tone layer.

4. The apparatus of claim 2, wherein no more than three phonetic symbols are associated with one key on the keypad on any layer; and wherein some of the keys have only one phonetic symbol mapped to the key.

5. The apparatus of claim 1, wherein the number of keys on the keypad is ten.

6. The apparatus of claim 1, wherein the keypad is coupled to one of: a mobile phone; a remote control; and a mobile computing device.

7. The apparatus of claim 2, wherein the number of layers is four.

8. A computer-implemented method for inputting characters, comprising:
   dividing a number of phonetic symbols into vowels and consonants;
   grouping the vowels that have a similar reading;
   grouping the consonants that have a similar reading;
   mapping a number of phonetic symbols to keys; wherein the number of keys is less than the number of phonetic symbols; wherein the vowels that have a similar reading are mapped to a same key during an input period; and wherein only consonants that have a similar reading are mapped to a same key during another input period, wherein at least one key includes only one consonant mapped to it, a portion of the keys include two consonants and another portion of the keys include three consonants; wherein at least one key during the another input period has more than one consonant mapped to it; wherein the phonetic symbols displayed during the input period for a key are different from the phonetic symbols displayed during the another input period for the key; wherein the mappings to the keys are constant regardless of a previous input;
   obtaining input from the keys; and
   generating a Chinese character in response to the obtained input.

9. The computer-implemented method of claim 8, wherein mapping the number of phonetic symbols to keys comprises mapping the phonetic symbols to different layers.

10. The computer-implemented method of claim 9, wherein mapping the phonetic symbols to the different layers comprises mapping each of the phonetic symbols to one of: a consonant layer; a vowels layer; and a tone layer.

11. The computer-implemented method of claim 10, further comprising determining when a reading of a first phonetic symbol is similar to a reading of a second phonetic symbol and when the readings are similar; mapping the first phonetic symbol and the second phonetic symbol to the same key.

12. The computer-implemented method of claim 11, wherein the number of keys is less than forty two.

13. The computer-implemented method of claim 8, further comprising determining when the input corresponds to one of a vowel; a consonant and a tone.

14. The computer-implemented method of claim 9, wherein the number of layers is four.

15. A computer-readable storage medium having computer-executable instructions for inputting Chinese characters, comprising:
   dividing a number of phonetic symbols into vowels and consonants;
   grouping the vowels that have a similar reading;
   grouping the consonants that have a similar reading;
   mapping a number of phonetic symbols to keys; wherein the number of keys is less than the number of phonetic symbols; wherein the vowels that have a similar reading are mapped to a same key during an input period; and wherein only consonants that have a similar reading are mapped to a same key during another input period, wherein at least one key includes only one consonant mapped to it, a portion of the keys include two consonants and another portion of the keys include three consonants; wherein at least one key during the another input period has more than one consonant mapped to it; wherein the phonetic symbols displayed during the input period for a key are different from the phonetic symbols displayed during the another input period for the key; wherein the mappings to the keys are constant regardless of a previous input;
   obtaining input from the keys; and
   generating a Chinese character in response to the obtained input.

16. The computer-readable storage medium of claim 15, wherein mapping the number of phonetic symbols to keys comprises mapping the phonetic symbols to four different layers.

17. The computer-readable storage medium of claim 16, wherein mapping the phonetic symbols to the different layers comprises mapping each of the phonetic symbols to one of: a consonant layer; a vowels layer; a middle vowels layer and a tone layer.

18. The computer-readable storage medium of claim 17, further comprising mapping phonetic symbols that have a similar reading to the same key.

19. The computer-readable storage medium of claim 18, wherein the number of keys is twelve.

20. The computer-readable storage medium of claim 15, further comprising determining when the input corresponds to one of a vowel; a consonant and a tone.

* * * * *